(12) United States Patent
Park et al.

(10) Patent No.: US 12,462,599 B2
(45) Date of Patent: Nov. 4, 2025

(54) DISPLAY DEVICE

(71) Applicant: Samsung Display Co., Ltd., Yongin-Si (KR)

(72) Inventors: Hyang A Park, Yongin-si (KR); Tae Kyung Ahn, Yongin-si (KR); Byung Han Yoo, Yongin-si (KR); Soo Yeong Hong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/659,283

(22) Filed: May 9, 2024

(65) Prior Publication Data

US 2025/0046113 A1 Feb. 6, 2025

(30) Foreign Application Priority Data

Aug. 1, 2023 (KR) .................. 10-2023-0100671

(51) Int. Cl.
| | |
|---|---|
| *G06V 40/13* | (2022.01) |
| *H10K 59/121* | (2023.01) |
| *H10K 59/122* | (2023.01) |
| *H10K 59/131* | (2023.01) |
| *H10K 59/65* | (2023.01) |

(52) U.S. Cl.
CPC ..... *G06V 40/1318* (2022.01); *H10K 59/1213* (2023.02); *H10K 59/1216* (2023.02); *H10K 59/122* (2023.02); *H10K 59/131* (2023.02); *H10K 59/65* (2023.02)

(58) Field of Classification Search
None
See application file for complete search history.

(56) References Cited

U.S. PATENT DOCUMENTS

| | | | |
|---|---|---|---|
| 11,158,258 B2 * | 10/2021 | Cha ..................... | G06V 10/143 |
| 11,594,582 B2 | 2/2023 | Han et al. | |
| 2022/0156477 A1 * | 5/2022 | Lee ..................... | H10K 59/131 |

FOREIGN PATENT DOCUMENTS

| | | |
|---|---|---|
| CN | 111430441 A | 7/2020 |
| KR | 10-20210064483 A | 6/2021 |
| KR | 10-20210158592 A | 12/2021 |
| KR | 10-20220079560 A | 6/2022 |

\* cited by examiner

*Primary Examiner* — Joseph R Haley
(74) *Attorney, Agent, or Firm* — Innovation Counsel LLP

(57) ABSTRACT

A display device includes a display panel partitioned into pixel rows, and the display panel includes pixels and fingerprint sensors arranged on the pixel rows, a panel driver for driving the pixels, and a sensor driver for detecting a user fingerprint, based on a sensing signal from the fingerprint sensors. The fingerprint sensors may include first fingerprint sensors on an odd-numbered pixel row and second fingerprint sensors on an even-numbered pixel row, and an area of an anode electrode of a light receiving element in each of the first fingerprint sensors may be equal to an area of an anode electrode of a light receiving element included in each of the second fingerprint sensors.

14 Claims, 9 Drawing Sheets

DISPLAY DEVICE

CROSS-REFERENCE TO RELATED APPLICATION

This application claims priority to and benefit of Korean Patent Application No. 10-2023-0100671, filed Aug. 1, 2023, which is hereby incorporated by reference for all purposes as if fully set forth herein.

BACKGROUND

1. Technical Field

One or more embodiments described herein relate to a display device.

2. Related Art

With the development of information technologies, the importance of a display device which is a connection medium between a user and information increases. Accordingly, display devices such as liquid crystal display devices and organic light emitting display devices are increasingly used.

Recent research has been conducted to develop a technique for integrating a fingerprint sensor (for recognizing a fingerprint or the like) with a display panel having a large area in a display device.

SUMMARY

An embodiment may provide a display device with a fingerprint sensor capable of eliminating a difference between a current sensed in an odd-numbered pixel row of the fingerprint sensor and a current sensed in an even-numbered pixel row of the fingerprint sensor.

In accordance with one embodiment of the present disclosure, there is provided a display device including: a display panel partitioned into a plurality of pixel rows, the display panel including a plurality of pixels and a plurality of fingerprint sensors, which are arranged on the plurality of pixel rows; a panel driver configured to drive the plurality of pixels; and a sensor driver configured to detect a fingerprint of a user, based on a sensing signal generated in the plurality of fingerprint sensors, wherein the plurality of fingerprint sensors include a plurality of first fingerprint sensors arranged on an odd-numbered pixel row and a plurality of second fingerprint sensors arranged on an even-numbered pixel row, and wherein an area of an anode electrode of a light receiving element included in each of the plurality of first fingerprint sensors is equal to an area of an anode electrode of a light receiving element included in each of the plurality of second fingerprint sensors.

A shape of the anode electrode of the light receiving element included in each of the plurality of first fingerprint sensors may be different from a shape of the anode electrode of the light receiving element included in each of the plurality of sensing fingerprint sensors.

The plurality of pixels may include a plurality of first pixels emitting red light, a plurality of second pixels emitting green light, and a plurality of third pixels emitting blue light.

The plurality of first pixels may be respectively included in each of a plurality of first pixel units, each of the first pixel units also including one of the second pixels. The plurality of third pixels may be respectively included in each of a plurality of second pixel units, each of the second pixel units including one of the second pixels.

The first fingerprint sensors may be included in the second pixel units arranged on the odd-numbered pixel row.

The second fingerprint sensors may be included in the second pixel units arranged on the even-numbered pixel row.

The first pixel units and the second pixel units may alternate with each other along a first direction and a second direction.

The first fingerprint sensor and the second fingerprint sensor may be arranged in a diagonal direction.

On the plurality of pixel rows, a distance between the first fingerprint sensor and the second fingerprint sensor may be constantly maintained.

Each of the plurality of pixels may include: a first pixel transistor including a first electrode connected to a first node, a second electrode connected to a second node, and a gate electrode connected to a third node; a second pixel transistor including a first electrode connected to a data line, a second electrode connected to the first node, and a gate electrode connected to a first scan line; a third pixel transistor including a first electrode connected to the second node, a second electrode connected to the third node, and a gate electrode connected to a second scan line; a fourth pixel transistor including a first electrode connected to the third node, a second electrode connected to a first initialization power line, and a gate electrode connected to a third scan line; a fifth pixel transistor including a first electrode connected to a first power line, a second electrode connected to the first node, and a gate electrode connected to an emission control line; a sixth pixel transistor including a first electrode connected to the second node, a second electrode connected to a fourth node, and a gate electrode connected to the emission control line; a seventh pixel transistor including a first electrode connected to the fourth node, a second electrode connected to a second initialization power line, and a gate electrode connected to a fourth scan line; a storage capacitor including a first electrode connected to the first power line and a second electrode connected to the third node; and a light emitting element including a first electrode connected to the fourth node and a second electrode connected to a second power line.

Each of the plurality of fingerprint sensors may include: a first sensing transistor including a first electrode connected to the second initialization power line, a second electrode connected to a sixth node, and a gate electrode connected to a fifth node; a second sensing transistor including a first electrode connected to the sixth node, a second electrode connected to a readout line, and a gate electrode connected to the first scan line; a third sensing transistor including a first electrode connected to a reset power line, a second electrode connected to the fifth node, and a gate electrode connected to a reset line; and the light receiving element including the anode electrode connected to the fifth node and a cathode electrode connected to the second power line.

A parasitic capacitance caused by the anode electrode arranged on the odd-numbered pixel row may be equal to a parasitic capacitance caused by the anode electrode arranged on the even-numbered pixel row.

In accordance with one embodiment of the present disclosure, there is provided a display device including a display panel partitioned into a plurality of pixel rows, wherein the display panel includes: a base layer; a sensor circuit layer disposed on the base layer; a plurality of anode electrodes disposed on the sensor circuit layer; a pixel defining layer including a plurality of openings exposing a portion of each of the plurality of anode electrodes; and a cathode electrode disposed on the pixel defining layer, wherein an area of each of a plurality of anode electrodes arranged on an odd-numbered pixel row among the plurality of anode electrodes is equal to an area of each of a plurality of anode electrodes arranged on an even-numbered pixel row among the plurality of anode electrodes.

A shape of each of the plurality of anode electrodes arranged on the odd-numbered pixel row may be different from a shape of each of the plurality of anode electrodes arranged on the even-numbered pixel row.

A parasitic capacitance formed between the plurality of anode electrodes arranged on the odd-numbered pixel row and the cathode electrode may be equal to a parasitic capacitance formed between the plurality of anode electrodes arranged on the even-numbered pixel row and the cathode electrode.

A first semiconductor layer, a light receiving layer, and a second semiconductor layer may be disposed in each of the plurality of openings. The first semiconductor layer may be disposed on the anode electrode, the light receiving layer may be disposed on the first semiconductor layer, and the second semiconductor layer may be disposed on the light receiving layer and be connected to the cathode electrode.

BRIEF DESCRIPTION OF THE DRAWINGS

The above and other features of embodiments of the present disclosure will become more apparent by describing in further detail embodiments thereof with reference to the accompanying drawings.

DETAILED DESCRIPTION

Figure 1:
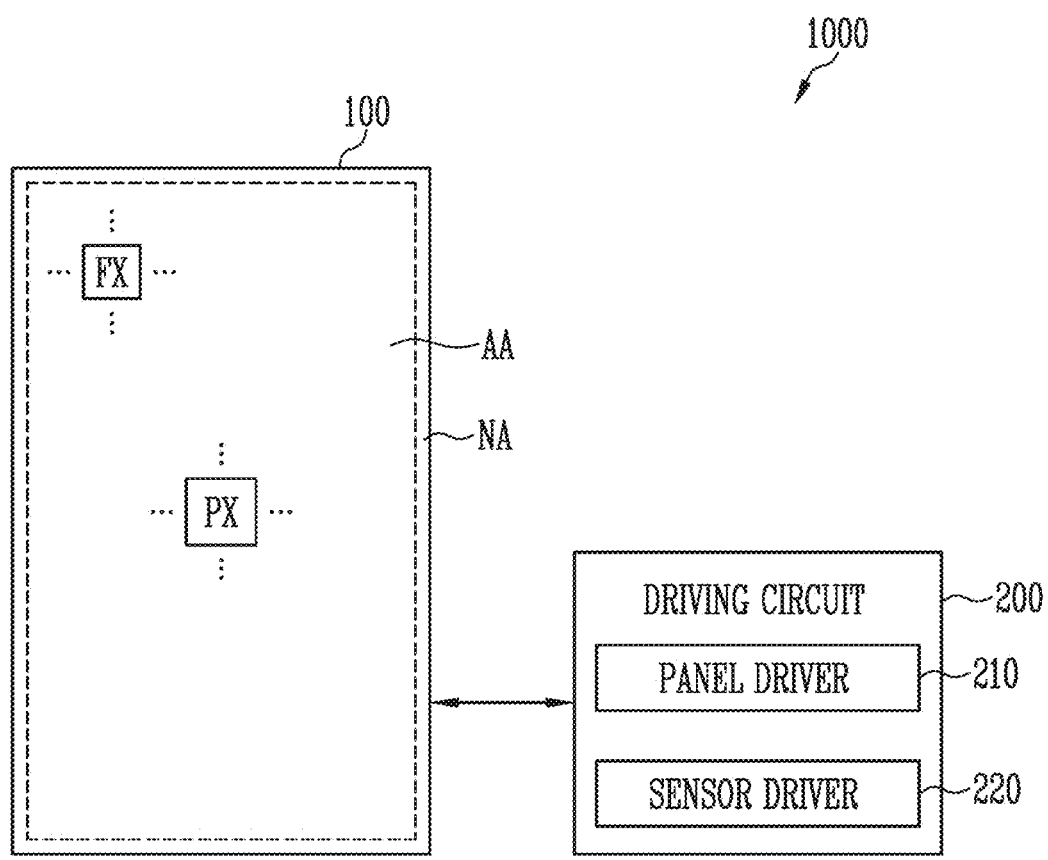
FIG. 1 schematically illustrates a display device in accordance with an embodiment of the present disclosure.

Specific embodiments are described more fully hereinafter with reference to the accompanying drawings, which show the embodiments. Other embodiments may, however, take many different forms, and the present disclosure should not be construed as being limited to the specific embodiments set forth herein. Rather, these embodiments are provided so that this disclosure will be thorough and complete, and will fully convey an understanding of the disclosed subject matter to those skilled in the art.

In describing the drawings, like reference numerals have been used for like elements. In the accompanying drawings, the dimensions of the structures may be enlarged or altered in order to more clearly explain the illustrated embodiments.

It will be understood that, although the terms "first", "second", etc. may be used herein to describe various elements, these elements should not be limited by these terms. These terms are only used to distinguish one element from another element. For instance, a first element discussed below could be termed a second element without departing from the present disclosure. Similarly, the second element could also be termed the first element.

The terminology used herein is for the purpose of describing particular embodiments only and is not intended to be limiting. As used herein, "a", "an," "the," and "at least one" do not denote a limitation of quantity and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components but do not preclude the presence or addition of one or more other features, regions, integers, steps, operations, elements, components, and/or groups thereof.

In the following description, when a first part is "connected" to a second part, this includes not only the case where the first part is directly connected to the second part but also the case where a third part is interposed therebetween and they are connected to each other.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" sides of other elements would then be oriented on "upper" sides of the other elements. The term "lower" may therefore encompass both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Hereinafter, specific embodiments will be described in detail with reference to the accompanying drawings.

FIG. 1 schematically illustrates a display device in accordance with an embodiment of the present disclosure. FIG. 1 particularly shows a display panel 100 and a driving circuit 200 that are separated from each other. However, the present disclosure is not limited thereto. For example, the whole or a portion of the driving circuit 200 may be integrally implemented in the display panel 100.

Referring to FIG. 1, a display device 1000 may include the display panel 100 and the driving circuit 200 for driving the display panel 200.

The display device 1000 may be a device which is activated according to an electrical signal and displays an image. For example, the display device 1000 may be used as a display screen of portable electronic devices such as a mobile phone, a smart phone, a tablet personal computer (PC), a mobile communication terminal, an electronic notebook, an electronic book, a portable multimedia player (PMP), a navigation system, and an ultra-mobile PC. In addition, the display device 1000 may be used as a display screen of various products such as a television, a notebook computer, a monitor, an advertisement board, and Internet of things (IoT).

The display device 1000 may be implemented as a self-luminous display device including a plurality of self-luminous elements. In particular, the display device 1000 may be an organic light emitting display device including organic light emitting elements. However, this is merely illustrative, and the display device 1000 may be implemented as a display device including inorganic light emitting elements, a display device including light emitting elements configured with a combination of an inorganic material and an organic material, or the like. Alternatively, the display device 1000 may be implemented as a liquid crystal display, a plasma display device, a quantum dot display device, or the like.

The display device 1000 may be a flat panel display device, a flexible display device, a curved display device, a foldable display device, or a bendable display device. Also, the display device 1000 may be applied to a transparent display device, a head-mounted display device, a wearable display device, and the like.

The display panel 100 may include a display area AA and a non-display area NA. The display area AA is an area in which a plurality of pixels PX are provided and may be referred to as an active area. Each of the plurality of pixels PX may include at least one light emitting element LD (see FIG. 3). For example, the light emitting element may include a light emitting layer. The display device 1000 may drive the plurality of pixels PX, corresponding to image data input from the outside, thereby displaying an image in the display area AA.

A plurality of fingerprint sensors FX may be included in the display area AA. Each of the plurality of fingerprint sensors FX may include a light receiving element PD (see FIG. 4) including a light receiving layer. The light receiving layer of the light receiving element PD (see FIG. 4) may be spaced apart from the light emitting layer of the light emitting element LD (see FIG. 3) in the display area AA.

The plurality of fingerprint sensors FX may be distributed throughout the entire area of the display area AA to be spaced apart from each other. However, this is merely illustrative. Only a portion of the display area AA may be set as a sensing area, and fingerprint sensors FX may be provided only in the sensing area. In addition, fingerprint sensors FX may be included in at least a portion of the non-display area NA.

The plurality of fingerprint sensors FX may sense light that was emitted from a light source (e.g., the pixels PX and the like) and reflected to the fingerprint sensors FX by an external object such as a finger of a user. Light that each fingerprint sensor senses may depend on light that a corresponding area of a fingerprint of the user reflects, and the pattern of light the plurality of fingerprint sensors FX senses indicates the fingerprint of the user. However, this is merely illustrative, and the plurality of fingerprint sensors FX may sense various biometric information such as an iris and a vein. Also, the plurality of fingerprint sensors FX may sense external light, and perform a function of a gesture sensor, a motion sensor, a proximity sensor, an illuminance sensor, an image sensor, or the like.

The non-display area NA may be an area provided at the periphery of the display area AA. For example, the non-display area NA may inclusively mean the area of the display panel 100 except the display area AA. The non-display area NA may include a line area, a pad area, various dummy areas, and the like.

The driving circuit 200 may include a panel driver 210 and a sensor driver 220. FIG. 1 illustrates the panel driver 210 and the sensor driver 220 as separated from each other. However, the present disclosure is not limited thereto. For example, at least a portion of the sensor driver 220 may be included in the panel driver 210 or may operate in linkage or conjunction with the panel driver 210.

The panel driver 210 may scan the plurality of pixels PX in the display area AA and supply data signals corresponding to image data to the plurality of pixels PX. The display panel 100 may then display an image corresponding to the data signals.

The panel driver 210 may supply a driving signal for fingerprint sensing to the plurality of pixels PX. The driving signal may allow or cause the plurality of pixels PX to emit light and thereby operate as a light source for the plurality of fingerprint sensors FX. The panel driver 210 may supply the above-described driving signal for fingerprint sensing and/or another driving signal to the plurality of fingerprint sensors FX. However, this is merely illustrative, and the sensor driver 220 may provide driving signals for fingerprint sensing.

The sensor driver 220 may detect biometric information including a user fingerprint and the like, based on a sensing signal received from the plurality of fingerprint sensors FX. For example, the sensor driver 220 may include an analog-digital converter which converts a sensing signal in the form of currents (or voltages) received from the plurality of fingerprint sensors FX into a digital signal (or digital code).

Figure 2:
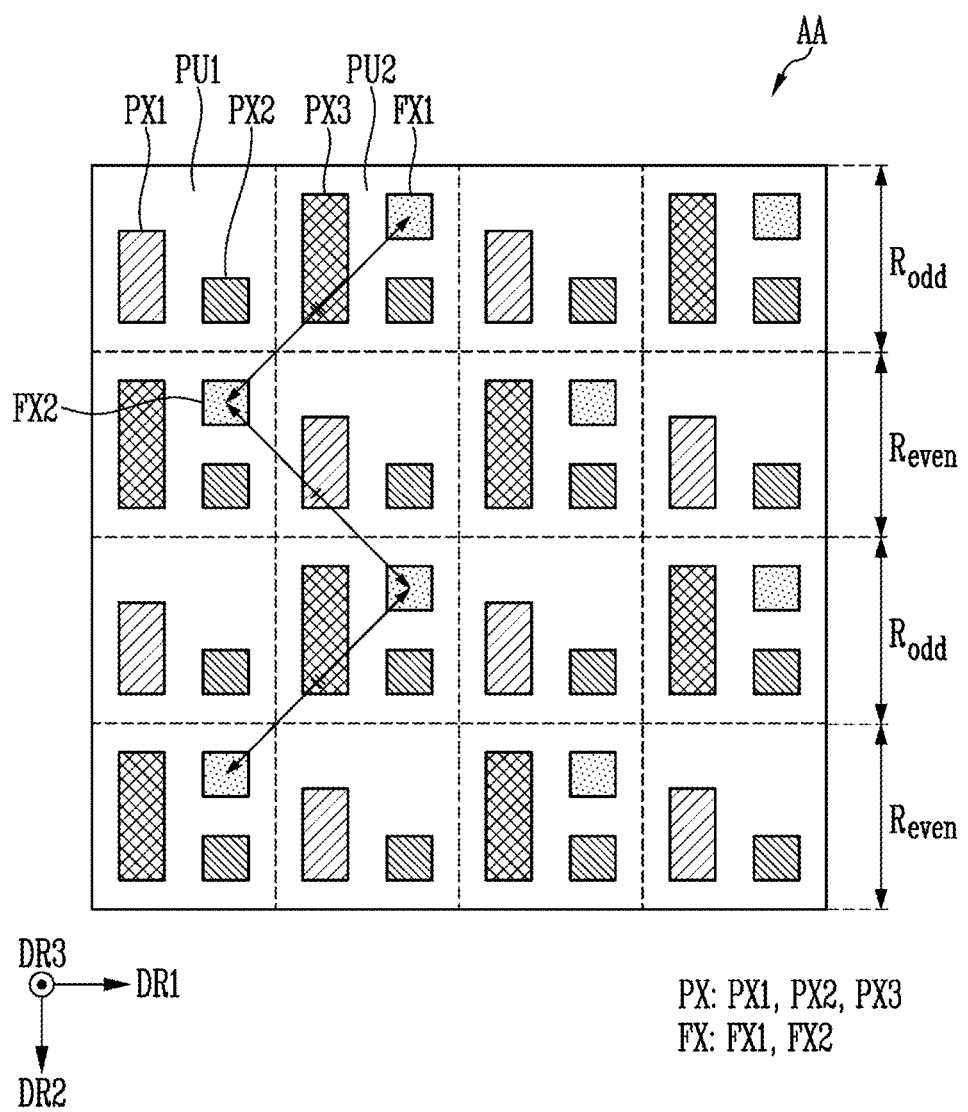
FIG. 2 illustrates a display area in accordance with an embodiment of the present disclosure.

FIG. 2 illustrates a display area in accordance with an embodiment of the present disclosure.

Referring to FIG. 2, a plurality of pixels PX and a plurality of fingerprint sensors FX may be disposed in the display area AA.

The plurality of pixels PX may be divided into first pixels PX1, second pixels PX2, and third pixels PX3 according to colors of emitted light. For example, the first pixels PX1 may emit red light, the second pixels PX2 may emit green light, and the third pixels PX3 may emit blue light.

Sizes of the first pixels PX1, the second pixels PX2, and the third pixels PX3 may be different from one another. For example, a size of the third pixels PX3 emitting the blue light may be greater than a size of the first pixels PX1 emitting the red light. In addition, the size of the first pixels PX1 emitting the red light may be greater than a size of the second pixels PX2 emitting the green light. However, this is merely illustrative, and the sizes of the first pixels PX1, the second pixels PX2, and the third pixels PX3 may be the same or be otherwise related. The size of each of the first pixels PX1, the second pixels PX2, or the third pixels PX3 may mean a size of an emission area (or opening area) the pixel.

The display area AA may be divided into a plurality of pixel rows each including a plurality of pixels PX and a plurality of fingerprint sensors FX. The plurality of pixel rows may include odd-numbered pixel rows $R_{odd}$ and even-numbered pixel rows $R_{even}$. The odd-numbered pixel row $R_{odd}$ and the even-numbered pixel row $R_{even}$ may be alternately arranged along a second direction DR2. Pixels PX of each of the plurality of pixel rows may be connected to the same scan line and controlled by the same scan signals.

Pixels PX on the odd-numbered pixel row $R_{odd}$ may be repeatedly arranged along a first direction DR1 in an order of a first pixel PX1, a second pixel PX2, a third pixel PX3, and another second pixel PX2. Pixels PX on the even-numbered pixel row $R_{even}$ may be repeatedly arranged along the first direction DR1 in an order of a third pixel PX3, a second pixel PX2, a first pixel PX1, and another second pixel PX2. An arrangement of the pixels PX of the odd-numbered pixel row $R_{odd}$ and an arrangement of the pixels PX of the even-numbered pixel row $R_{even}$ may be alternately repeated along the second direction. However, this is merely illustrative, and the arrangement of the pixels PX is not limited thereto.

The plurality of fingerprint sensors FX may be divided into first fingerprint sensors FX1 and second fingerprint sensors FX2 according to a pixel row on which fingerprint sensors FX are arranged. For example, the first fingerprint sensors FX1 may be arranged on the odd-numbered pixel rows $R_{odd}$, and the second fingerprint sensors FX2 may be arranged on the even-numbered pixel rows $R_{even}$.

The first fingerprint sensors FX1 on each odd-numbered pixel row $R_{odd}$ may be spaced apart from each other. The second fingerprint sensors FX2 on each even-numbered pixel row $R_{even}$ may be spaced apart from each other. Accordingly, the first fingerprint sensor FX1 and the second fingerprint sensor FX2 in an adjacent row may be offset from the first fingerprint sensor FX1 in a diagonal direction relative to the first direction DR1 and the second direction. A distance between the first fingerprint sensor FX1 and the second fingerprint sensor FX2, which are adjacent to each other, may be constantly maintained along the second direction DR2. The distance between the first fingerprint sensor FX1 and the second fingerprint sensor FX2 may mean a distance between a light receiving area (or opening area) of the first fingerprint sensor FX1 and a light receiving area (or opening area) of the second fingerprint sensor FX2.

The display area AA may include a plurality of first pixel units PU1 and a plurality of second pixel units PU2. The first pixel unit PU1 and the second pixel unit PU2 may be alternately repeated along the first direction DR1 and the second direction DR2. Each of the plurality of first pixel units PU1 may include a first pixel PX1 and a second pixel PX2. Each of the plurality of second pixel unit PU2 may include a second pixel PX2, a third pixel PX3, and a fingerprint sensor FX. Each of second pixel units PU2 of the odd-numbered pixel row $R_{odd}$ may include a first fingerprint sensor FX1, and each of second pixel units PU2 of the even-numbered pixel row $R_{even}$ may include a second fingerprint sensor FX2.

Figure 3:
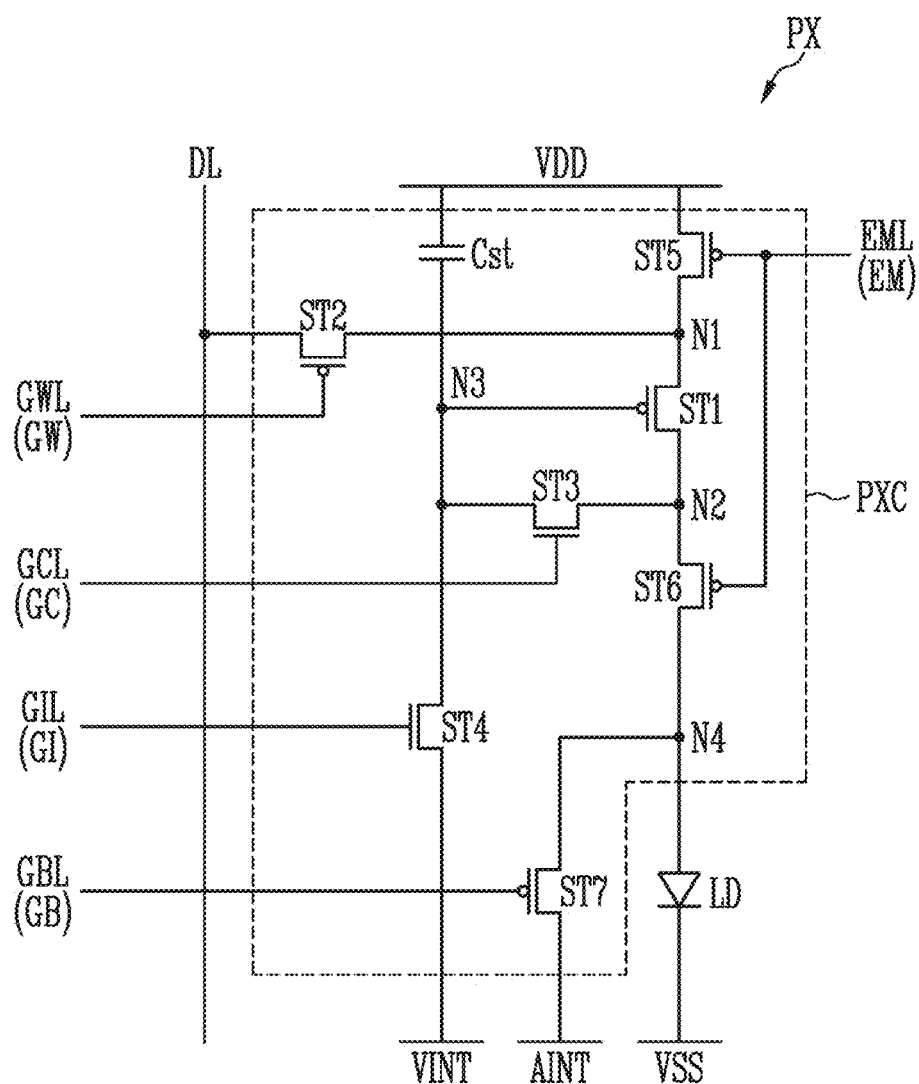
FIG. 3 illustrates a pixel in accordance with an embodiment of the present disclosure.

FIG. 3 is an equivalent circuit diagram of a pixel PX in accordance with an embodiment of the present disclosure.

Referring to FIG. 3, the pixel PX may include a pixel circuit PXC and a light emitting element LD. The pixel circuit PXC may include pixel transistors ST1 to ST7 and a storage capacitor Cst.

A first electrode of a first pixel transistor ST1 may be connected to a first node N1, a second electrode of the first pixel transistor ST1 may be connected to a second node N2, and a gate electrode of the first pixel transistor ST1 may be connected to a third node N3. The first pixel transistor ST1 may control a driving current flowing from a first power voltage VDD to a second power voltage VSS via the light emitting element LD, so that the driving current corresponds to a voltage of the third node N3.

A first electrode of a second pixel transistor ST2 may be connected to a data line DL, a second electrode of the second pixel transistor ST2 may be connected to the first node N1, and a gate electrode of the second pixel transistor ST2 may be connected to a first scan line GWL. The second pixel transistor ST2 may be turned on when a first scan signal GW having a gate-on level is supplied to the first scan line GWL, causing the second pixel transistor ST2 to electrically connect the data line DL and the first electrode of the first pixel transistor ST1 to each other.

A first electrode of a third pixel transistor ST3 may be connected to the second node N2, a second electrode of the third pixel transistor ST3 may be connected to the third node N3, and a gate electrode of the third pixel transistor ST3 may be connected to a second scan line GCL. The third pixel transistor ST3 may be turned on when a second scan signal having the gate-on level is supplied to the second scan line GCL, causing the third pixel transistor ST3 to electrically connect the second electrode of the first pixel transistor ST1 and the third node N3 to each other. That is, when the third pixel transistor ST3 is turned on, the first pixel transistor ST1 may be a diode-connected transistor.

A first electrode of a fourth pixel transistor ST4 may be connected to the third node N3, a second electrode of the fourth pixel transistor ST4 may be connected to a first initialization power line to which a first initialization power voltage VINT is applied, and a gate electrode of the fourth pixel transistor ST4 may be connected to a third scan line GIL. The fourth pixel transistor ST4 may be turned on when a third scan signal GI having the gate-on level is supplied to the third scan line GIL, causing the fourth pixel transistor ST4 to supply the first initialization power voltage VINT to the third node N3.

A first electrode of a fifth pixel transistor ST5 may be connected to a first power line to which the first power voltage VDD is applied, a second electrode of the fifth pixel transistor ST5 may be connected to the first node N1, and a gate electrode of the fifth pixel transistor ST5 may be connected to an emission control line EML. The fifth pixel transistor ST5 may be turned off when an emission control signal EM having a gate-off level is supplied to the emission control line EML and may be turned on in other cases.

A first electrode of a sixth pixel transistor ST6 may be connected to the second node N2, a second electrode of the sixth pixel transistor ST6 may be connected to a fourth node N4, and a gate electrode of the sixth pixel transistor ST6 may be connected to the emission control line EML. The sixth pixel transistor ST6 may be turned off when the emission control signal EM having the gate-off level is supplied to the emission control line EML and may be turned on in other cases.

A first electrode of a seventh pixel transistor ST7 may be connected to the fourth node N4, a second electrode of the seventh pixel transistor ST7 may be connected to a second initialization power line to which a second initialization power voltage AINT is applied, and a gate electrode of the seventh pixel transistor ST7 may be connected to a fourth scan line GBL. The seventh pixel transistor ST7 may be turned on when a fourth scan signal GB having the gate-on level is supplied to the fourth scan line GBL, causing the seventh pixel transistor ST7 to supply the second initialization power voltage AINT to the fourth node N4. The second initialization power voltage AINT may be set as a voltage lower than a data signal.

Some transistors ST1, ST2, ST5, ST6, and ST7 among the pixel transistors ST1 to ST7 may be implemented with a P-type (PMOS) transistor, and the other transistors ST3 and ST4 may be implemented with an N-type (NMOS) transistor. However, this is merely illustrative, and each of the pixel transistors ST1 to ST7 may be a P-type (PMOS) transistor or an N-type (NMOS) transistor.

A first electrode of the storage capacitor Cst may be connected to the first power line to which the first power voltage VDD is applied, and a second electrode of the storage capacitor Cst may be connected to the third node N3. The storage capacitor Cst may store a voltage corresponding to the data signal and a threshold voltage of the first pixel transistor ST1.

A first electrode of the light emitting element LD may be connected to the fourth node N4, and a second electrode of the light emitting element LD may be connected to a second power line to which the second power voltage VSS is applied. At least one light emitting element LD may be provided in the pixel PX, and the kind of the light emitting element LD is not limited. For example, the light emitting element LD may be an organic light emitting element, an inorganic light emitting element such as a micro LED or a quantum dot LED, or a light emitting element including a combination of an organic material and an inorganic material.

Figure 4:
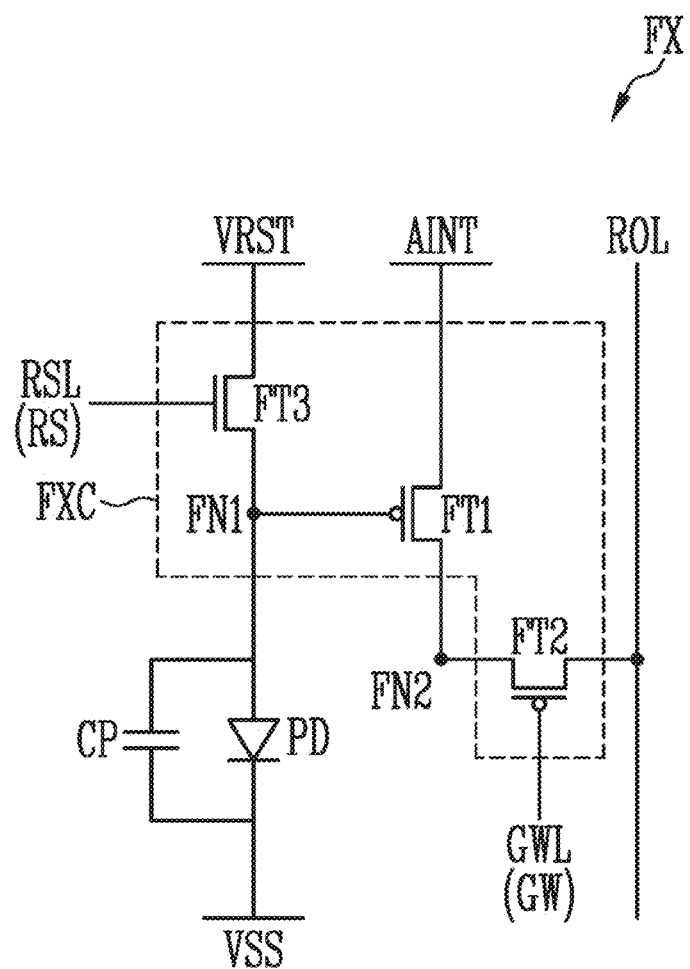
FIG. 4 illustrates a fingerprint sensor in accordance with an embodiment of the present disclosure.

FIG. 4 is an equivalent circuit diagram of a fingerprint sensor FX in accordance with an embodiment of the present disclosure.

Referring to FIG. 4, the fingerprint sensor FX may include a sensor circuit FXC and a light receiving element PD. The sensor circuit FXC may include sensing transistors FT1 to FT3.

A first electrode of a first sensing transistor FT1 may be connected to the second initialization power line to which the second initialization power voltage AINT is applied, a second electrode of the first sensing transistor FT1 may be connected to a second node FN2, and a gate electrode of the first sensing transistor FT1 may be connected to a first node FN1. The first sensing transistor FT1 may supply the second initialization power voltage AINT to the second node FN2, depending on a voltage of the first node FN1 and the conductivity of a second sensing transistor FT2. When the second sensing transistor FT2 is on, the first sensing transistor FT1 may control a sensing current flowing through the first sensing transistor FT1, the sensing current corresponding to the voltage of the first node N1. The sensing current may be supplied as a sensing signal to a readout line ROL via the second sensing transistor FT2.

A first electrode of the second sensing transistor FT2 may be connected to the second node FN2, a second electrode of the second sensing transistor FT2 may be connected to the readout line ROL, and a gate electrode of the second sensing transistor FT2 may be connected to the first scan line GWL. That is, the same scan line, i.e., the first scan line GWL may be connected to the gate electrode of the second sensing transistor FT2 and the gate electrode of the second pixel transistor ST2 (see FIG. 3). The second sensing transistor FT2 may be turned on when the first scan signal having the gate-on level is supplied to the first scan line GWL, causing the second sensing transistor FT2 to electrically connect the second electrode of the first sensing transistor FT1 and the readout line ROL to each other.

A first electrode of a third sensing transistor FT3 may be connected to a reset power line to which a reset voltage VRST is applied, a second electrode of the third sensing transistor FT3 may be connected to the first node FN1, and a gate electrode of the third sensing transistor FT3 may be connected to a reset line RSL. The third sensing transistor FT3 may be turned on when a reset signal having the gate-on level is supplied to the reset line RSL, causing the third sensing transistor FT3 to supply the reset voltage VRST to the first node FN1. Accordingly, the first node FN1, i.e., the gate electrode of the first sensing transistor FT1 may be reset to the reset voltage VRST.

Some transistors FT1 and FT2 among the sensing transistors FT1 to FT3 may be implemented with a P-type (PMOS) transistor, and the other transistor FT3 among the sensing transistors FT1 to FT3 may be implemented with an N-type (NMOS) transistor. However, this is merely illustrative, and each of the sensing transistors FT1 to FT3 may be a P-type (PMOS) transistor or an N-type (NMOS) transistor.

A first electrode of the light receiving element PD may be connected to the first node N1, and a second electrode of the light receiving element PD may be connected to the second power line to which the second power voltage VSS is applied. The light receiving element PD may recognize a fingerprint pattern of a user, based on light reflected from a finger of the user. For example, the light receiving element PD may convert energy of light reflected by a ridge or valley on the finger of the user into an electrical signal (current or voltage) formed between the first electrode and the second electrode of the light receiving element PD. The converted electrical signal may flow in the second power line at the first node N1. The light that is reflected by the ridge or valley on the finger of the user and then reaches the light receiving element PD may be light that is output from the light emitting element LD (see FIG. 3) of the pixel PX (see FIG. 3) and then reflected by the ridge or valley on the finger of the user.

The light receiving element PD may be configured as a photo transistor or a photo diode. The light receiving element PD may correspond to a photo sensor which converts light energy into electrical energy and uses a photovoltaic effect in which a flowing current changes according to an intensity of the light converted.

The first electrode of the light receiving element PD may be an anode electrode, and the second electrode of the light receiving element PD may be a cathode electrode. A parasitic capacitor CP may generate noise by attenuating or delaying an electrical signal generated in the light receiving element PD, and therefore, the parasitic capacitor CP may degrade the efficiency or reliability of the fingerprint sensor FX. The amount of the noise generated by the parasitic capacitor CP may depend on an area of overlap of the anode and cathode electrodes of light receiving element PD.

Figure 5:
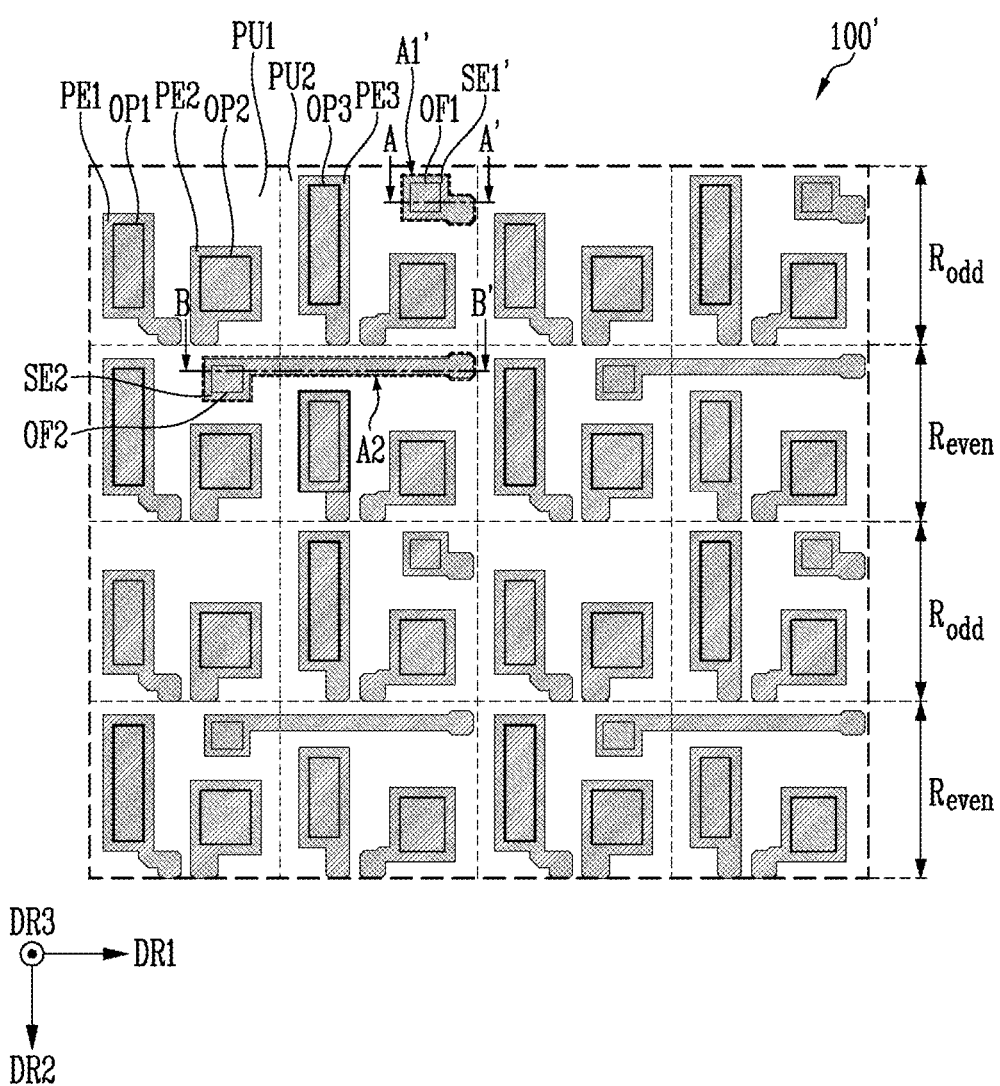
FIG. 5 illustrates a layout of a display panel in accordance with an embodiment of the present disclosure.

FIG. 5 shows a layout of a display panel in accordance with an embodiment of the present disclosure. In FIG. 5, a first pixel electrode PE1 may be an anode electrode of a light emitting element included in the first pixel PX1 (see FIG. 2), a second pixel electrode PE2 may be an anode electrode of a light emitting element included in the second pixel PX2 (see FIG. 2), and a third pixel electrode PE3 may be an anode electrode of a light emitting element included in the third pixel PX3 (see FIG. 2). Also, in FIG. 5, a first sensor electrode SE1' may be an anode electrode of a light receiving element included in the first fingerprint sensor FX1 (see FIG. 2), and a second sensor electrode SE2 may be an anode electrode of a light receiving element included in the second fingerprint sensor FX2 (see FIG. 2).

Referring to FIG. 5, the display panel 100' may be partitioned into a first plurality of pixel rows, i.e., odd-numbered pixel rows $R_{odd}$ and a second plurality of pixel rows, i.e., even-numbered pixel rows $R_{even}$. On the odd-numbered pixel row $R_{odd}$, a plurality of pixel electrodes PE1, PE2, and PE3 may be repeatedly arranged along the first direction DR1 in an order of a first pixel electrode PE1, a second pixel electrode PE2, a third pixel electrode PE3, and a second pixel electrode PE2. On the even-numbered pixel row $R_{even}$, a plurality of pixel electrodes PE1, PE2, and PE3 may be repeatedly arranged along the first direction DR1 in an order of a third pixel electrode PE3, a second pixel electrode PE2, a first pixel electrode PE1, and a second pixel electrode PE2. That is, a first pixel electrode PE1 and a second pixel electrode PE2 may be included in each of the first pixel units PU1, and a second pixel electrode PE2 and a third pixel electrode PE3 may be included in each of the second pixel units PU2.

An opening area OP1 (or emission area) exposing a portion of the first pixel electrode PE1 may overlap an area of the first pixel electrode PE1. An opening area OP2 (or emission area) exposing a portion of the second pixel electrode PE2 may overlap an area of the second pixel electrode PE2. An opening area OP3 (or emission area) exposing a portion of the third pixel electrode PE3 may overlap an area the third pixel electrode PE3.

The first sensor electrode SE1' may be included in the second pixel unit PU2. An opening area OF1 (or light receiving area) exposing a portion of the first sensor electrode SE1' may overlap the first sensor electrode SE1'. The second sensor electrode SE2 may extend into both the first pixel unit PU1 and the second pixel unit PU2. An opening area OF2 (or light receiving area) exposing a portion of the second sensor electrode SE2 may overlap the second sensor electrode SE2.

As shown in FIG. 5, shapes of the first sensor electrode SE1' and the second sensor electrode SE2 may be different from each other, and an area A2 of the second sensor electrode SE2 may be larger than an area A1' of the first sensor electrode SE1'. In some cases, the second sensor electrode SE2 may extend from the second pixel unit PU2 into the first pixel unit PU1 to facilitate electrical connection to underlying structures that may run the second direction DR2 and connect to the first sensor electrode SE1' and the second sensor electrode SE2.

Figure 6:
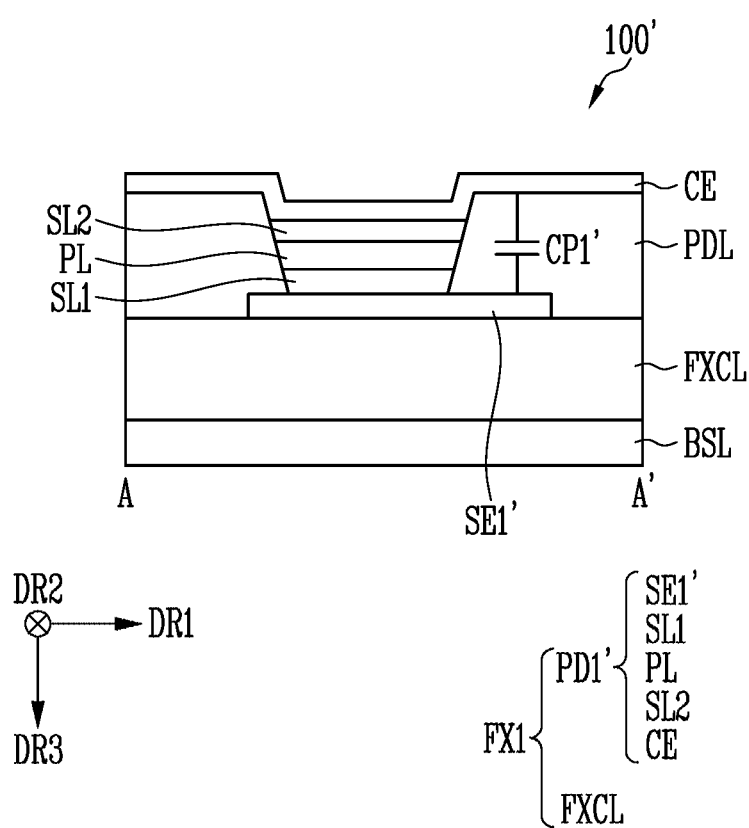
FIG. 6 is a cross-sectional view illustrating a section taken along a line A-A' shown in FIG. 5.
Figure 7:
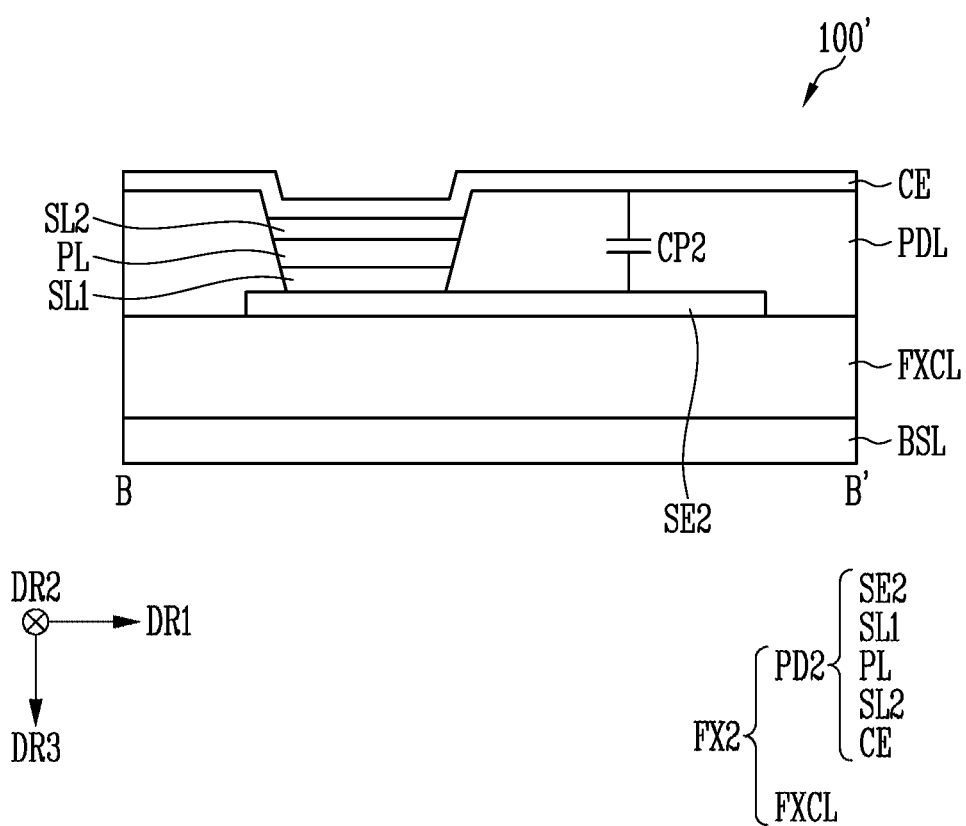
FIG. 7 is a cross-sectional view illustrating a section taken along a line B-B' shown in FIG. 5.

FIG. 6 shows a cross-section of the display panel 100' taken along a line A-A' shown in FIG. 5. FIG. 7 shows a cross-section of the display panel 100' taken along a line B-B' shown in FIG. 5.

Referring to FIGS. 6 and 7, the display panel 100' may include a base layer BSL, a sensor circuit layer FXCL, light receiving elements PD1' and PD2, and a pixel defining layer PDL. A first fingerprint sensor FX1 may include the light receiving element PD1' and a portion of the sensor circuit layer FXCL. A second fingerprint sensor FX2 may include the light receiving element PD2 and another portion of the sensor circuit layer FXCL.

The base layer BSL may be a member providing a base surface on which the sensor circuit layer FXCL is disposed. The base layer BSL may be a glass substrate, a metal substrate, a polymer substrate, or the like. However, the present disclosure is not limited thereto, and the base layer BSL may be an inorganic layer, an organic layer, or a composite material layer.

The base layer BSL may have a multi-layer structure. For example, the base layer BSL may have a triple-layer structure of a synthetic resin layer, an adhesive layer, and a synthetic resin layer. In particular, the synthetic resin layer may include polyimide-based resin. Also, the synthetic resin layer may include at least one of acrylate-based resin, methacrylate-based resin, polyisoprene-based resin, vinyl-based resin, epoxy-based resin, urethane-based resin, cellulose-based resin, siloxane-based resin, polyamide-based resin, and perylene-based resin.

The sensor circuit layer FXCL may be disposed on the base layer BSL. The sensor circuit layer FXCL may include an insulating layer, a semiconductor pattern, a conductive pattern, a signal line, and the like. An insulating layer, a semiconductor layer, and a conductive layer may be formed on the base layer BSL through a process such as coating or deposition. The insulating layer, the semiconductor layer, and the conductive layer may be selectively patterned by performing one or more photolithography processes.

The light receiving element PD1' shown in FIG. 6 may include a first sensor electrode SE1', a cathode electrode Cem and regions of a first semiconductor layer SL1, a light receiving layer PL, and a second semiconductor layer SL2. The light receiving element PD2 shown in FIG. 7 may include a second sensor electrode SE2, the cathode electrode, and regions of the first semiconductor layer SL1, the light receiving layer PL, and the second semiconductor layer SL2.

The first sensor electrode SE1' and the second sensor electrode SE2 may be disposed on the sensor circuit layer FXCL. Each of the first sensor electrode SE1' and the second sensor electrode SE2 may be formed as a single layer of conductive material such as molybdenum (Mo), titanium (Ti), copper (Cu) or aluminum (Al), or may be formed as a stacked structure (Ti/Al/Ti) of aluminum and titanium, a stacked structure (ITO/Al/ITO) of aluminum and ITO, an APC alloy, or a stacked structure (ITO/APC/ITO) of the APC alloy and ITO.

The first semiconductor layer SL1 may be disposed on the first sensor electrode SE1' and the second sensor electrode SE2. The first semiconductor layer SL may be an N-type semiconductor layer. The N-type semiconductor layer may supply electrons to the light receiving layer PL. For example, the first semiconductor layer SL1 may include an electron transport layer and an electron injection layer, but the present disclosure is not limited thereto.

The light receiving layer PL may be disposed on the first semiconductor layer SL1. The light receiving layer PL may be depleted by the first semiconductor layer SL1 and the second semiconductor layer SL2, so that an electric field may be generated inside the light receiving layer PL. Incident light, e.g., light reflected by a finger of a user and incident onto the light receiving layer PL) may create holes and electrons that drift in response to the electric field. Therefore, the holes may be collected to the cathode electrode CE through the second semiconductor layer SL2, and the electrons may be collected to the first sensor electrode SE1' through the first semiconductor layer SL1.

The second semiconductor layer SL2 may be disposed on the light receiving layer PL. The second semiconductor layer SL2 may be a P-type semiconductor layer. The P-type semiconductor layer may supply holes to the light receiving layer PL. For example, the second semiconductor layer SL2 may include a hole transport layer and a hole injection layer, but the present disclosure is not limited thereto.

The cathode electrode CE may be disposed on the second semiconductor layer SL2 and the pixel defining layer PDL. The cathode electrode CE may include a transparent conductive material capable of allowing light to be transmitted therethrough. For example, the cathode electrode CE may include at least one of Indium Tin Oxide (ITO), Indium Zinc Oxide (IZO), and Indium Tin-Zinc Oxide (ITZO), but the present disclosure is not limited thereto.

The pixel defining layer PDL may be disposed on the first sensor electrode SE1' and the sensor circuit layer FXCL. Also, the pixel defining layer PDL may be disposed on the second sensor electrode SE2 and the sensor circuit layer FXCL. The pixel defining layer PDL may include an opening exposing a portion of the first sensor electrode SE1'. Also, the pixel defining layer PDL may include an opening exposing a portion of the second sensor electrode SE2. The opening formed in the pixel defining layer PDL shown in FIG. 6 may correspond to the opening area OF1 shown in FIG. 5. The opening formed in the pixel defining layer PDL shown in FIG. 7 may correspond to the opening area OF2 shown in FIG. 5. The pixel defining layer PDL may include an organic insulating material and/or an inorganic insulating material. Also, the pixel defining layer PDL may include a light blocking material.

As described above, when the area A2 of the second sensor electrode SE2 is larger than the area A1' of the first sensor electrode SE1' (see FIG. 5), a parasitic capacitance CP2 formed between the second sensor electrode SE2 and the cathode electrode CE may be greater than a parasitic capacitance CP1' formed between the first sensor electrode SE1' and the cathode electrode CE. That is, a difference in parasitic capacitance may occur between the first fingerprint sensor FX1 of the odd-numbered pixel row $R_{odd}$ and the second fingerprint sensor FX2 of the even-numbered pixel row $R_{even}$. Therefore, a difference may occur between a current sensed in the first fingerprint sensor FX1 and a current sensed in the second fingerprint sensor FX2, and hence the efficiency or reliability of fingerprint sensing may be deteriorated.

Figure 8:
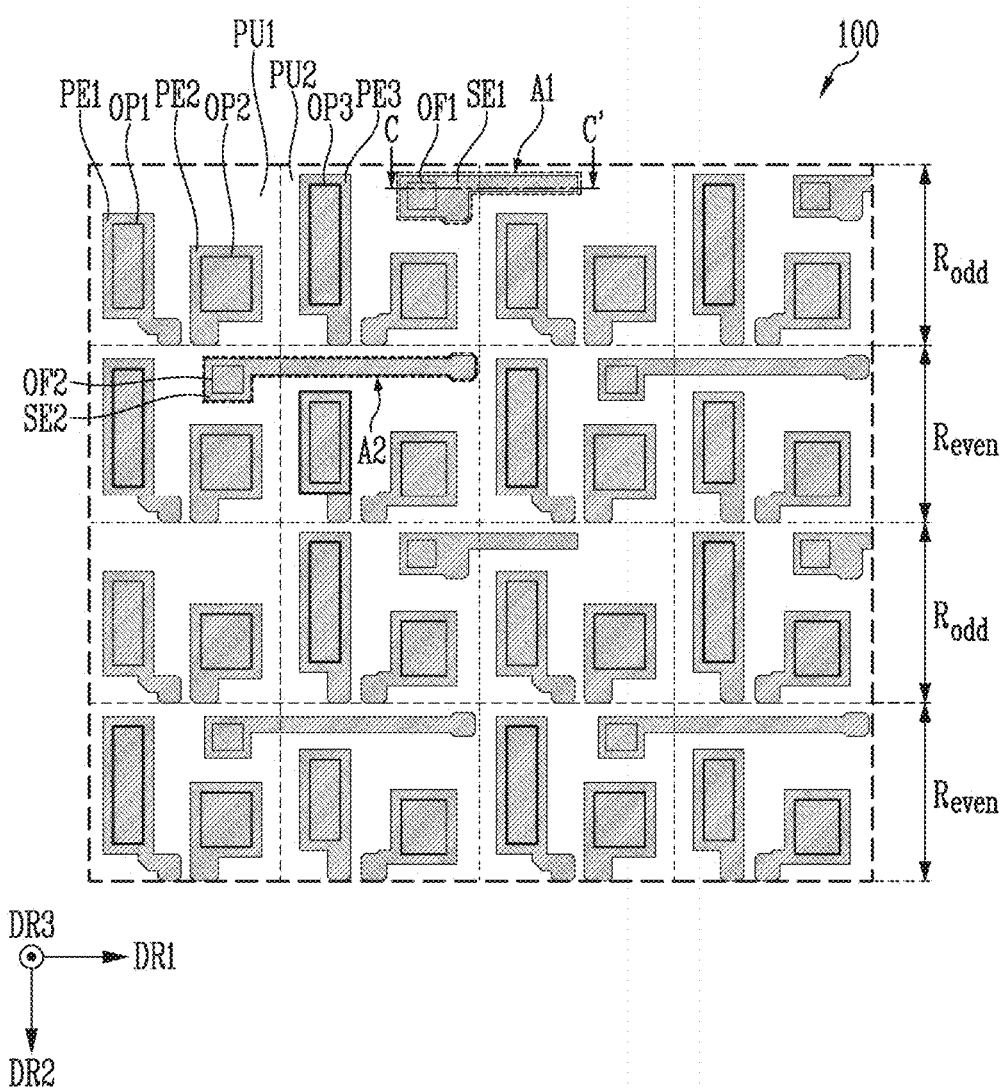
FIG. 8 shows a layout of a display panel in accordance with an embodiment of the present disclosure.
Figure 9:
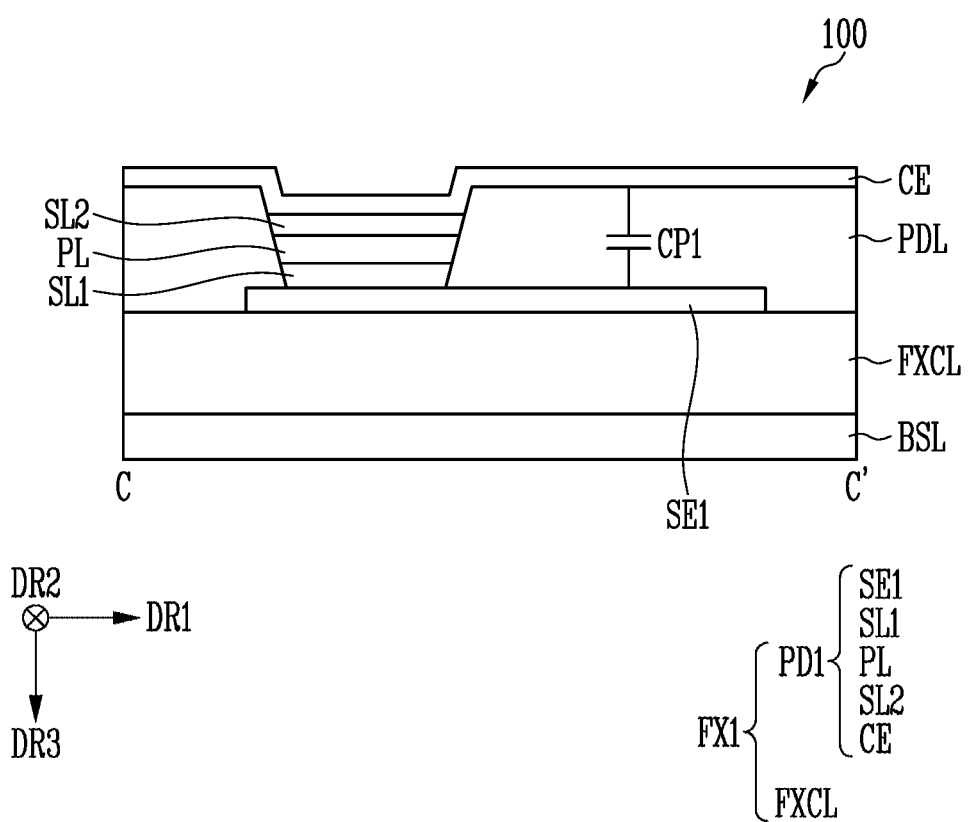
FIG. 9 is a cross-sectional view illustrating a section taken along a line C-C' shown in FIG. 8.

FIG. 8 shows a layout of a display panel 100 in accordance with an embodiment of the present disclosure. FIG. 9 shows a cross-section of the display panel 100 taken along a line C-C' shown in FIG. 8. In relation to FIG. 8, descriptions of features that are similar to or the same as those already described with reference to FIG. 5 may be omitted or simplified. In relation to FIG. 9, descriptions of features that are similar to or the same as those already described with reference to FIG. 6 may be omitted or simplified.

Referring to FIG. 8, a first sensor electrode SE1 in accordance with the illustrated embodiment may extend from a first pixel unit PU1 into an adjacent second pixel unit PU2. That is, the first sensor electrode SE1 extends along the first direction DR1, so that an area A1 of the first sensor electrode SE1 can increase. Accordingly, the area A1 of the first sensor electrode SE1 disposed on the odd-numbered pixel row $R_{odd}$ may be equal to an area A2 of a second sensor electrode SE2 disposed on the even-numbered pixel row $R_{even}$. That is, a shape of the first sensor electrode SE1 may be different from a shape of the second sensor electrode SE2, but the first sensor electrode SE1 may have the same area as the second sensor electrode SE2.

Referring to FIG. 9, as the area A1 (see FIG. 8) of the first sensor electrode SE1 increases, a parasitic capacitance CP1 formed between the first sensor electrode SE1 and the cathode electrode CE may increase. Accordingly, the parasitic capacitance CP1 formed between the first sensor electrode SE1 and the cathode electrode CE may become equal to a parasitic capacitance CP2 formed between the second sensor electrode SE2 and the cathode electrode CE (see FIG. 7). That is, a difference in parasitic capacitance may be eliminated between the first fingerprint sensor FX1 of the odd-numbered pixel row Road and the second fingerprint sensor FX2 of the even-numbered pixel row $R_{even}$. As a result, a difference between a current sensed in the first fingerprint sensor FX1 and a current sensed in the second fingerprint sensor FX2 is eliminated, so that the efficiency or reliability of fingerprint sensing can be improved.

In accordance with the present disclosure, a difference between a current sensed in fingerprint sensors of an odd-numbered pixel row and a current sensed in fingerprint sensors of an even-numbered pixel row is eliminated, thereby improving the efficiency and reliability of fingerprint sensing.

Although the present disclosure has been specifically described according to the above-described embodiments, it should be noted that the above-described embodiments are intended as illustrations and not to limit the scope of the present disclosure. Those of ordinary skill in the art to which the present disclosure pertains will understand that various modifications are possible within the scope of the technical spirit of the present disclosure.

Therefore, the technical protection scope of the present disclosure is not limited to the detailed description described in the specification but should be determined by the appended claims. In addition, all changes or modifications derived from the meaning and scope of the claims and their equivalents should be construed as being included in the scope of the present invention. The embodiments may be combined to form additional embodiments.

What is claimed is:
1. A display device comprising:
   a display panel partitioned into a plurality of pixel rows, the display panel including a plurality of pixels and a plurality of fingerprint sensors, which are arranged on the plurality of pixel rows;
   a panel driver configured to drive the plurality of pixels; and
   a sensor driver configured to detect a fingerprint of a user, based on a sensing signal generated in the plurality of fingerprint sensors,
   wherein the plurality of fingerprint sensors includes a plurality of first fingerprint sensors arranged on an odd-numbered pixel row and a plurality of second fingerprint sensors arranged on an even-numbered pixel row,
   wherein an area of an anode electrode of a light receiving element included in each of the plurality of first fingerprint sensors is equal to an area of an anode electrode of a light receiving element included in each of the plurality of second fingerprint sensors, and
   wherein a shape of the anode electrode of the light receiving element included in each of the plurality of first fingerprint sensors is different from a shape of the anode electrode of the light receiving element included in each of the plurality of second fingerprint sensors.

2. The display device of claim 1, wherein the plurality of pixels includes a plurality of first pixels emitting red light, a plurality of second pixels emitting green light, and a plurality of third pixels emitting blue light.

3. The display device of claim 2, wherein
   the first pixels are respectively included in first pixel units, each of the first pixel units including one of the second pixels, and
   the third pixels are respectively included in second pixel units, each of the second pixel units including one of the second pixels.

4. The display device of claim 3, wherein the first fingerprint sensors are in the second pixel units arranged on the odd-numbered pixel row.

5. The display device of claim 3, wherein the second fingerprint sensors are in the second pixel units arranged on the even-numbered pixel row.

6. The display device of claim 3, wherein the first pixel units and the second pixel units alternate with each other along a first direction and a second direction.

7. The display device of claim 1, wherein the first fingerprint sensors and the second fingerprint sensors are arranged in a diagonal direction relative to the plurality of pixel rows.

8. The display device of claim 7, wherein, on the plurality of pixel rows, a distance between each of the first fingerprint sensors and the second fingerprint sensors is constantly maintained.

9. The display device of claim 1, wherein each of the plurality of pixels includes:
a first pixel transistor including a first electrode connected to a first node, a second electrode connected to a second node, and a gate electrode connected to a third node;
a second pixel transistor including a first electrode connected to a data line, a second electrode connected to the first node, and a gate electrode connected to a first scan line;
a third pixel transistor including a first electrode connected to the second node, a second electrode connected to the third node, and a gate electrode connected to a second scan line;
a fourth pixel transistor including a first electrode connected to the third node, a second electrode connected to a first initialization power line, and a gate electrode connected to a third scan line;
a fifth pixel transistor including a first electrode connected to a first power line, a second electrode connected to the first node, and a gate electrode connected to an emission control line;
a sixth pixel transistor including a first electrode connected to the second node, a second electrode connected to a fourth node, and a gate electrode connected to the emission control line;
a seventh pixel transistor including a first electrode connected to the fourth node, a second electrode connected to a second initialization power line, and a gate electrode connected to a fourth scan line;
a storage capacitor including a first electrode connected to the first power line and a second electrode connected to the third node; and
a light emitting element including a first electrode connected to the fourth node and a second electrode connected to a second power line.

10. The display device of claim 9, wherein each of the plurality of fingerprint sensors includes:
a first sensing transistor including a first electrode connected to the second initialization power line, a second electrode connected to a sixth node, and a gate electrode connected to a fifth node;
a second sensing transistor including a first electrode connected to the sixth node, a second electrode connected to a readout line, and a gate electrode connected to the first scan line;
a third sensing transistor including a first electrode connected to a reset power line, a second electrode connected to the fifth node, and a gate electrode connected to a reset line; and
the light receiving element including the anode electrode connected to the fifth node and a cathode electrode connected to the second power line.

11. The display device of claim 10, wherein a parasitic capacitance caused by the anode electrode arranged on the odd-numbered pixel row is equal to a parasitic capacitance caused by the anode electrode arranged on the even-numbered pixel row.

12. A display device comprising a display panel partitioned into a plurality of pixel rows,
wherein the display panel includes:
a base layer;
a sensor circuit layer disposed on the base layer;
a plurality of anode electrodes disposed on the sensor circuit layer;
a pixel defining layer including a plurality of openings extending to a portion of each of the plurality of anode electrodes; and
a cathode electrode disposed on the pixel defining layer,
wherein an area of each of a plurality of anode electrodes arranged on an odd-numbered pixel row among the plurality of anode electrodes is equal to an area of each of a plurality of anode electrodes arranged on an even-numbered pixel row among the plurality of anode electrodes, and
wherein a shape of each of the plurality of anode electrodes arranged on the odd-numbered pixel row is different from a shape of each of the plurality of anode electrodes arranged on the even-numbered pixel row.

13. The display device of claim 12, wherein a parasitic capacitance formed between the plurality of anode electrodes arranged on the odd-numbered pixel row and the cathode electrode is equal to a parasitic capacitance formed between the plurality of anode electrodes arranged on the even-numbered pixel row and the cathode electrode.

14. The display device of claim 12, wherein a first semiconductor layer, a light receiving layer, and a second semiconductor layer are disposed in each of the plurality of openings, and
wherein the first semiconductor layer is disposed on each of the plurality of anode electrodes,
the light receiving layer is disposed on the first semiconductor layer, and
the second semiconductor layer is disposed on the light receiving layer and is connected to the cathode electrode.

* * * * *